US009104717B2

(12) United States Patent
Verma et al.

(10) Patent No.: US 9,104,717 B2
(45) Date of Patent: Aug. 11, 2015

(54) DISTRIBUTED STORAGE OBJECT DELETE

(71) Applicant: FutureWei Technologies, Inc., Plano, TX (US)

(72) Inventors: Ajit Verma, Los Altos, CA (US); John Plocher, San Jose, CA (US); Xiongbing Ou, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 146 days.

(21) Appl. No.: 13/755,573

(22) Filed: Jan. 31, 2013

(65) Prior Publication Data

US 2014/0214782 A1    Jul. 31, 2014

(51) Int. Cl.
*G06F 17/30*    (2006.01)

(52) U.S. Cl.
CPC ................ *G06F 17/30371* (2013.01)

(58) Field of Classification Search
CPC .......... G06F 17/3023; G06F 17/30309; G06F 17/30356; G06F 17/30359; G06F 17/30371
USPC ........................ 707/638, 661, 662, 694, 695
See application file for complete search history.

(56) References Cited

U.S. PATENT DOCUMENTS

| | | | | |
|---|---|---|---|---|
| 7,769,792 | B1 * | 8/2010 | Burrows et al. | 707/814 |
| 7,991,737 | B2 * | 8/2011 | Nielsen et al. | 707/613 |
| 8,849,825 | B1 * | 9/2014 | Mchugh et al. | 707/737 |
| 2009/0024633 | A1 * | 1/2009 | Swanburg et al. | 707/10 |
| 2009/0083056 | A1 | 3/2009 | Gole et al. | |
| 2009/0300077 | A1 * | 12/2009 | Shi et al. | 707/204 |
| 2011/0295936 | A1 * | 12/2011 | Gill et al. | 709/203 |
| 2012/0136832 | A1 * | 5/2012 | Sadhwani | 707/640 |
| 2014/0149353 | A1 * | 5/2014 | Lee et al. | 707/639 |

FOREIGN PATENT DOCUMENTS

| | | |
|---|---|---|
| CN | 101256572 A | 9/2008 |
| CN | 101809571 A | 8/2010 |
| CN | 102646127 A | 8/2012 |

OTHER PUBLICATIONS

International Search Report, PCT/CN2014/071592, date of mailing May 19, 2014.

* cited by examiner

*Primary Examiner* — Hares Jami
(74) *Attorney, Agent, or Firm* — Slater & Matsil, L.L.P.

(57) ABSTRACT

System and methods for storage object distribution using dynamic policy controls are provided. An embodiment method deleting an object in a distributed storage system includes receiving, from a client, a delete request for an object, retrieving, by a primary datacenter, an object metadata list corresponding to the object to be deleted, and inserting, by the primary datacenter, a delete marker on a top of a stack data structure in an object metadata list.

18 Claims, 3 Drawing Sheets

DISTRIBUTED STORAGE OBJECT DELETE

TECHNICAL FIELD

The present disclosure relates to distributed storage systems and, in particular embodiments, to distributed storage systems offering reliable object deletion.

BACKGROUND

Deleting an object due to a DELETE Object request or PUT (Update) Object request in running storage service in a multiple datacenter (MDC) environment is a complex task. Multiple DELETE and PUT requests may arrive during a small window. In addition, the requests may be interleaved. Furthermore, subsequent requests sent to remote datacenters may arrive out of sequence and some of the requests may fail. A distributed storage system needs to handle these cases with deterministic behavior and needs to achieve eventual consistency within a predictable period.

If distributed system architecture does not handle the DELETE operation properly, there can be several use cases resulting in unintended data losses that cannot be recovered.

SUMMARY

An embodiment method of deleting an object in a distributed storage system includes receiving, from a client, a delete request for the object, retrieving, by a primary datacenter, an object metadata list corresponding to the object to be deleted, and inserting, by the primary datacenter, a delete marker on a top of a stack data structure in the object metadata list.

An embodiment method of updating metadata in a distributed storage system includes creating, by an object storage controller, a current version of the metadata corresponding to an object in response to a command received from a client, and chronologically storing, in a storage cluster, the current version of the metadata corresponding to the object along with previous versions of the metadata corresponding to the object.

An embodiment method of storing metadata in a distributed storage system includes receiving, at an object storage controller, a command corresponding to an object from a client, loading, by the object storage controller, an object metadata list associated with the object from a storage cluster, and updating, with the object storage controller, the object metadata list associated with the object by creating a current version of the metadata and retaining previous versions of the metadata.

An embodiment datacenter in a distributed storage system includes an object storage controller configured to receive a command regarding an object from a client and to create a current version of metadata corresponding the object in response to the command, and a memory associated with the object storage controller, the memory configured to chronologically store the current version of the metadata corresponding to the object in a stack along with at least one previous version of the metadata corresponding to the object.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely datacenters operating in a distributed storage system. The concepts in the disclosure may also apply, however, to other types of storage systems and associated devices and components.

Figure 1:
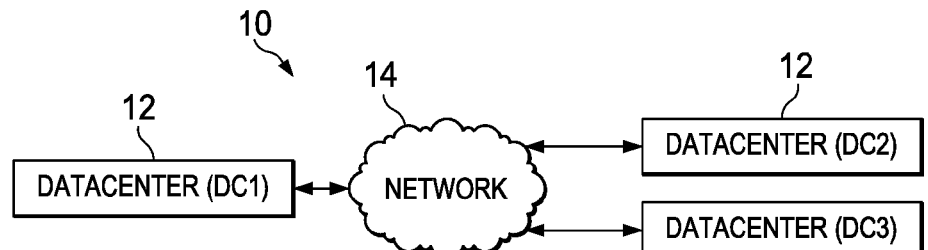
FIG. 1 illustrates an embodiment distributed storage system.

Referring now to FIG. 1, an embodiment distributed storage system 10 is illustrated. As shown, the embodiment distributed storage system 10 includes several datacenters 12 communicating through a network 14 (e.g., the Internet). It should be recognized that a practical application of the embodiment distributed storage system 10 may include components, devices, hardware, and so on, which have not been included in FIG. 1 for ease of illustration. In addition, the embodiment distributed storage system 10 may include more or fewer datacenters 12 than depicted in FIG. 1. In an embodiment, one of the datacenters 12, which is labeled DC1, is considered the primary datacenter while the other datacenters, labeled DC2 and DC3, are considered secondary or back-up datacenters.

Figure 2:
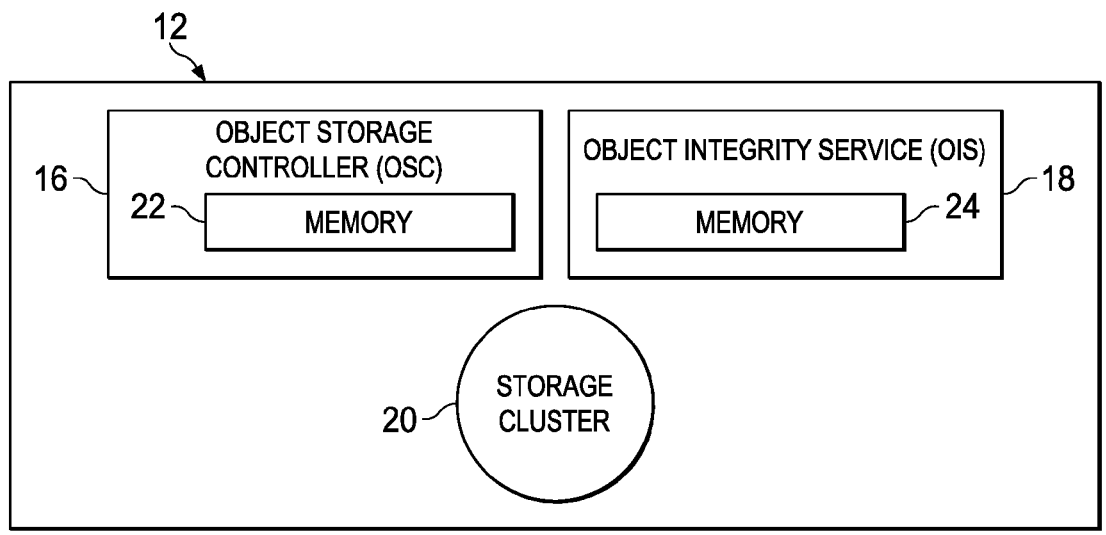
FIG. 2 illustrates an embodiment datacenter from the embodiment distributed storage system of FIG. 1 is illustrated in further detail.

Referring now to FIG. 2, an embodiment datacenter 12 is illustrated in further detail. As shown, the datacenter 12 includes an object storage controller (OSC) 16, an object integrity service (OIS) 18, and a storage cluster 20. In an embodiment, the object storage controller 16 is a server or other computing device loaded with appropriate software to perform the functions described herein. It should be recognized that the embodiment datacenter 12 may include components, devices, hardware (e.g., routers, firewalls, cashing controller, etc.), which have not been included in FIG. 1 for ease of illustration.

The object storage controller 16 is configured to interact with clients. In particular, the object storage controller 16 is configured to receive commands from one or more clients regarding an object containing data and stored within the embodiment distributed storage system 10. The command may be a delete object command, an update object command (i.e., a put command), a get command, and so on. In an embodiment, a delete command may not cause an object to be immediately deleted in the embodiment distributed storage system 10. Rather, the delete command may indicate that the object may eventually be permanently deleted from the storage cluster 20. However, the object will not be accessible to clients once the delete command has been successfully processed by the embodiment distributed storage system 10.

As will be more fully explained below, the object storage controller 16 of the primary datacenter 12 (DC1) may receive different commands (a.k.a., requests, application programming interface (API) calls, etc.) relating to the same object from different clients at or around the same time. For example, a first client may instruct the object storage controller 16 to delete an object at or about the same time that a second client instructs the object storage controller 16 to update the object. Unless handled appropriately, this and other conflict scenarios can cause data integrity problems in the embodiment distributed storage system 10.

Still referring to FIG. 2, the object storage controller 16 includes an object storage controller memory 22. As will be more fully explained below, the object storage controller memory 22 stores, among other things, metadata and metadata lists. Such metadata and/or metadata lists may be uploaded from the storage cluster 20 or sent to the storage cluster 20 for storage.

The object integrity service 18 is in communication with the object storage controller 16. In an embodiment, the object integrity service 18 is a server or other computing device loaded with appropriate software to perform the functions described herein. The object integrity service 18 is configured to detect and correct errors in metadata and objects, check the integrity of data stored in the embodiment distributed storage system 10, react to tasks in a queue, perform scrubbing operations, and so on.

Still referring to FIG. 2, the object integrity service 18 includes an object integrity service memory 24. As will be more fully explained below, the object integrity service memory 24 stores, among other things, metadata and metadata lists, task lists, a queue with tasks, and so on. Such metadata and/or metadata lists may be received from the object storage controller 16, from other datacenters 12 (e.g., DC2, DC3), uploaded from the storage cluster 20, and so on.

The storage cluster 20 represents a plurality of servers or other computing devices. In an embodiment, the storage cluster 20 is a collection of servers each having a storage device. The storage device may take the form of a magnetic disk, an optical drive, flash memory, and so on. The storage cluster 20 may be referred to as Sea of Disk (SoD). As will be more fully explained below, the storage cluster 20 is configured to store metadata pertaining to an object in a metadata list format as shown FIG. 3.

Figure 3:
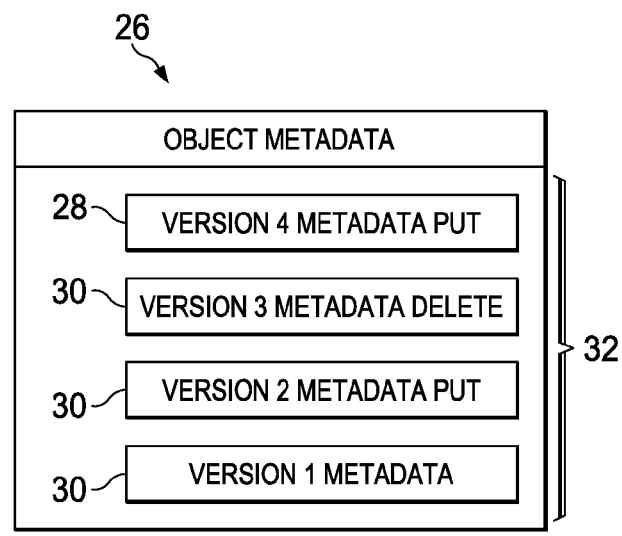
FIG. 3 illustrates an embodiment object metadata list including current and previous versions of metadata corresponding to an object.

As shown in FIG. 3, the object metadata list 26 includes metadata associated with a current version of an object, which is referred to as a current version of the metadata 28. The object metadata list 26 also includes metadata associated with previous or older versions of the metadata for the same object, which is referred to as previous versions of the metadata 30. The metadata in the object metadata list 26 of FIG. 3 is used within the embodiment distributed storage system 10 to coordinate the activities associated with a version of the object (e.g., parity generation, compression, multi-datacenter copying, recovery, deletion, garbage collection, etc.).

As shown in FIG. 3, the current version of the metadata 28 and the previous versions of the metadata 30 are organized in a stack data structure 32. As such, the metadata in the object metadata list 26 may be referred to as generations of metadata, a list of versions of metadata, and so on. Indeed, each PUT request received from a client regarding an object creates a new "current" version of the metadata. The new "current" version of the metadata is stored in the object metadata list 26 along with the previous versions of the metadata (including the one that is no longer current) for that object. Notably, the previous versions of the metadata 30 are retained when the current version of the metadata 28 is created and placed in stack data structure 32 of the object metadata list 26.

In an embodiment, the current version of the metadata 28 is disposed at the top of the stack data structure 32 as oriented in FIG. 3. Moreover, the current version of the metadata 28 and the previous versions of the metadata 30 are stored chronologically in the object metadata list 26. If a DELETE request is received from the client, a special version of the metadata, known as a delete marker, is placed on the stack data structure 32. For example, in FIG. 3 the previous version of the metadata 30 labeled "Version 3 metadata DELETE" is a delete marker, which signifies that that the version of the object below the delete marker, in this case the version of the object that corresponds to "Version 2 metadata PUT," has been or will be deleted.

Still referring to FIG. 3, the current version of the metadata 28 and the previous versions of the metadata 30 each include, for example, an object name, a universal unique identifier (UUID), a timestamp, an entity tag (ETag), an object size, an access control list, and so on. The UUID identifies the object itself while the ETag identifies the content of the object. Indeed, in an embodiment the ETag is a checksum or hash value of the content. The UUID is internal to the embodiment distributed storage system 10, whereas the ETag is returned as a header in response to some of the client requests.

Because the current version of the metadata 28 is situated at the top of the object metadata list 26 above the previous versions of the metadata 30, the datacenters 12 know which version of the metadata is the most current. Indeed, and as will be more fully explained below, the data centers 12 benefitting from the embodiment distributed storage architecture described herein are able to compare the information in the metadata (e.g., the ETag, the timestamp, etc.) in the current version of the metadata 28 and the previous versions of the metadata 30 to resolve conflicting commands received from different clients at or about the same time. A few examples are provided herein to illustrate the point.

To begin, when a client intends to upload an object, the client sends the following update command (i.e., PUT) or request for the object to the primary datacenter 12 (DC1) in FIG. 1, which for the purposes of this example has the universal resource locator (URL) of uds.example.com.

---

PUT bucketName/objectName HTTP/1.1
Host: uds.example.com
Date: Wed 19 Dec 2012 17:50:00 GMT
Content-Type: plain/text
Content-Length: 6748
Authorization: XXX xxx:yyy
[6748 bytes of data]

---

When the update command is received, the primary datacenter (DC1) takes the following actions. First, the primary datacenter 12 (DC1) retrieves the object metadata list 26 corresponding to the object being updated from the storage cluster 20 and temporarily stores it in the object storage controller memory 22. Thereafter, the primary datacenter 12 (DC1) creates a new current version of the metadata 28 and places that new version of the metadata on the top of the stack data structure 32 in the object metadata list 26 shown in FIG. 3.

Once the new current version of the metadata 28 has been placed at the top of the stack data structure 32 in the object metadata list 26, the primary datacenter 12 (DC1) records the system time as the timestamp in the new current version of the metadata 28. The timestamp is considered the object creation time.

The primary datacenter 12 (DC1) also generates the UUID and stores the UUID in the new current version of the metadata 28. Once the UUID has been created, the primary datacenter 12 (DC1) will begin writing the content or data corresponding to the update request in UUID segments (e.g., UUID.0, UUID.1, UUID.2, etc.) until all the content or data has been updated per the request from the client. The primary datacenter 12 (DC1) also generates an ETag for the object received from the client. The ETag, which is based on the content of the object, is saved in the new current version of the metadata 28.

If the upload is successful, the primary datacenter 12 (DC1) in FIG. 1 sends the following response to the client, which includes the timestamp that was recorded and the ETag that was generated.

```
HTTP/1.1200 OK
Date: Wed 19 Dec 2012 17:55:45 GMT
ETag: "1b2cf535f27731c974343645a3985328"
Server: embodiment distributed storage
```

Where multiple datacenters 12 are involved as illustrated in FIG. 1, the primary datacenter 12 (DC1) may forward the update command to the secondary datacenters 12 (DC2, DC3). In an embodiment, the primary datacenter 12 (DC1) forwards the update command as soon as possible after it is received in order to create a synchronous copy of the object on one of the secondary datacenters 12. In an embodiment, the primary datacenter 12 (DC1) may also request that an asynchronous copy of the object be stored on one or more of the secondary datacenters 12.

In other words, when the update command is received at the primary datacenter 12 (DC1), the object may be updated at the primary datacenter 12 (DC1) and at the secondary primary datacenter 12 (DC2) immediately followed by an instruction that the object be updated at another secondary datacenter 12 (DC3) sometime in the future when, for example, system resources or other factors deem appropriate. As such, at least one backup copy of the object is made right away. In an embodiment, the synchronous copy of the object is made at the secondary datacenter 12 (DC2) prior to the response being sent to the client indicating a successful upload.

Where multiple datacenters 12 are involved, the update request will look similar to the one depicted above. However, an additional header, x-hws-request-timestamp, is added. The value of this header is the timestamp discussed above, as shown.

```
PUT bucketName/objectName HTTP/1.1
Host: uds2.example.com
Date: Wed 19 Dec 2012 17:52:00 GMT
Content-Type: plain/text
Content-Length: 6748
Authorization: XXX abc:def
x-hws-request-timestamp: Wed 19 Dec 2012 17:50:35 GMT
[6748 bytes of data]
```

Now that the current version of the metadata 28 in the object metadata list includes an ETag corresponding to the most recent version of the content, the ETag may be beneficially used in connection with subsequent DELETE requests. For example, when the primary datacenter 12 (DC1) sends subsequent DELETE requests to the secondary datacenters 12 (DC2, DC3), it will include the ETag value in the If-Match header. The secondary datacenters 12 (DC2, DC3) will match the ETag value with the value that they have stored. If the received and stored ETag values match, the DELETE request is successfully executed by the secondary datacenters 12 (DC2, DC3). If the received and stored ETag values do not match, the DELETE request is ignored. In an embodiment, the client may optionally send an ETag header along with the DELETE request.

In light of the above, where multiple datacenters are involved the ETag may be used to ensure that commands are executed properly. By way of example, if the primary datacenter 12 (DC1) and the secondary datacenter 12 (DC2) each have version three of an object, but the other secondary datacenter 12 (DC3) still has version two of an object, a command from a client to delete the object will include the ETag that indicates which version, either version three or version two in this example, should be deleted. By knowing the correct version to act on, race conditions and other potentially detrimental conflicting command problems are alleviated in the multiple datacenter 12 context.

When a client intends to delete an object, the client sends the following delete command or request for the object to the primary datacenter 12 (DC1) in FIG. 1, which for the purposes of this example has the universal resource locator (URL) of uds.example.com.

```
DELETE bucketName/objectName HTTP/1.1
Host: uds.example.com
Date: Wed 19 Dec 2012 18:50:00 GMT
Content-Type: plain/text
Authorization: XXX xxx:yyy
```

When the delete command is received, the primary datacenter (DC1) takes the following actions. First, the primary datacenter 12 (DC1) retrieves the object metadata list 26 corresponding to the object being deleted from the storage cluster 20 and temporarily stores it in the object storage controller memory 22. Thereafter, the primary datacenter 12 (DC1) inserts a delete marker on the top of the stack data structure 32 in the object metadata list 26 shown in FIG. 3.

After the delete marker has been placed at the top of the stack data structure 32, the version of the object immediately below the delete mark in the stack data structure 32 is no longer available if a new READ request is received from the client.

If the delete is successful, the primary datacenter 12 (DC1) in FIG. 1 sends the following response to the client, which includes the timestamp that was recorded.

```
HTTP/1.1 204 No Content
Date: Wed 19 Dec 2012 17:55:45 GMT
Server: embodiment distributed storage
```

Where multiple datacenters 12 are involved, as illustrated in FIG. 1, the primary datacenter 12 (DC1) may forward the delete command to the secondary datacenters 12 (DC2, DC3). The delete request will look similar to the one depicted above. However, two additional headers, "x-hws-request-timestamp" and "If-match," are added. The value of the "x-hws-request-timestamp" header is the timestamp and the value of the "If-match" header is the value of the ETag that was generated during the update command when the object was created or uploaded, as shown.

```
DELETE bucketName/objectName HTTP/1.1
Host: uds2.example.com
Date: Wed 19 Dec 2012 17:52:00 GMT
Authorization: XXX abc:def
x-hws-request-timestamp: Wed 19 Dec 2012 17:50:35 GMT
If-Match: "1b2cf535f27731c974343645a3985328"
[6748 bytes of data]
```

If the delete is successful, the secondary datacenter 12 (DC2, DC3) sends back the following response, which includes the ETag, to the primary datacenter 12 (DC1) in FIG. 1.

```
HTTP/1.1 204 No Content
Date: Wed 19 Dec 2012 17:53:41 GMT
ETag: "1b2cf535f27731c974343645a3985328"
Server: embodiment distributed storage2
```

Now that the current version of the metadata 28 in the object metadata list includes an ETag corresponding to the most recent version of the content, the ETag may be beneficially used in connection with subsequent DELETE requests. For example, when the primary datacenter 12 (DC1) sends subsequent DELETE requests to the secondary datacenters 12 (DC2, DC3), it will include the ETag value in the If-Match header. The secondary datacenters 12 (DC2, DC3) will match the ETag value with the value that they have stored. If the received and stored ETag values match, the DELETE request is successfully executed by the secondary datacenters 12 (DC2, DC3). If the received and stored ETag values do not match, the DELETE request is ignored. In an embodiment, the client may optionally send an ETag header along with the DELETE request.

Notably, if any of the secondary datacenters 12 (DC2, DC3) is not using the embodiment distributed storage architecture described herein and is instead using, for example, an Amazon S3 compatible system, then the secondary datacenter 12 (DC2, DC3) would likely ignore both the x-hws-request-timestamp and If-match headers. In the alternative, the secondary datacenters 12 (DC2, DC3) may attempt to use other information, such as the timestamp, to resolve and conflicts. In either case, the secondary datacenter 12 (DC2, DC3) would not send back the ETag header in response to the primary datacenter 12 (DC1). This might cause the secondary datacenter 12 (DC2, DC3) without the embodiment distributed storage architecture described herein to delete a newer version of the object unintentionally.

For example, assume that the primary datacenter 12 (DC1) and one of the secondary datacenters 12 (DC2) have been updated to a version three of the object and another of the secondary datacenters 12 (DC3) still contains version two of the object. If the third datacenter 12 (DC3) is not equipped with the embodiment distributed storage architecture described herein, the third datacenter 12 (DC3) will not recognize the ETag in the request to delete version three of the object. As such, the third datacenter 12 will simply delete version two of the object despite the request being intended for version three. In contrast, both the primary datacenters 12 (DC1) and the secondary datacenter 12 (DC2) that do have the embodiment distributed storage architecture described herein, will delete version three of the object as instructed and will leave version two of the object alone.

If the above unintended delete at the secondary datacenter 12 (DC3) of the second version of the object occurs, the object integrity service 18 will eventually recognize the problem and restore the second version of the object which was inappropriately deleted so that the integrity of the data in the embodiment distributed storage system is maintained. In other words, the object integrity service 18 running in the primary datacenter 12 (DC1) would take action to make the object status consistent in all the datacenters 12.

In contrast to the above, where the secondary datacenters 12 (DC2, DC3) are using the embodiment distributed storage architecture described herein, the secondary datacenters 12 (DC2, DC3) will compare the ETag value in the If-Match header of the request with the ETag value corresponding to the object. If the values don't match, the secondary datacenters (DC2, DC3) know to reject the delete request.

Figure 4:
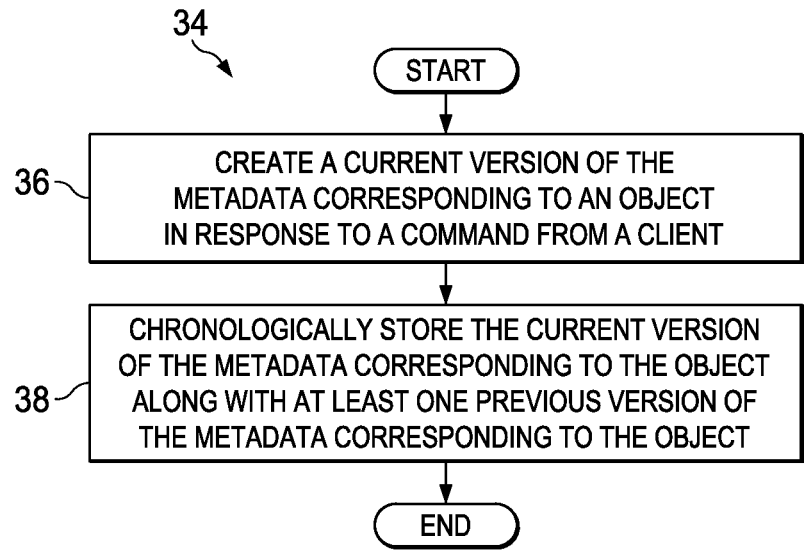
FIG. 4 illustrates an embodiment method of updating metadata in the embodiment distributed storage system of FIG. 1.

Referring now to FIG. 4, an embodiment method 34 of updating metadata in a distributed storage system 10 is illustrated. In block 36, the object storage controller 16 creates a current version of the metadata 28 corresponding to an object in response to a command received from a client. In block 38, the object storage controller memory 22 chronologically stores the current version of the metadata 28 corresponding to the object along with at least one previous version of the metadata 30 corresponding to the object.

Figure 5:
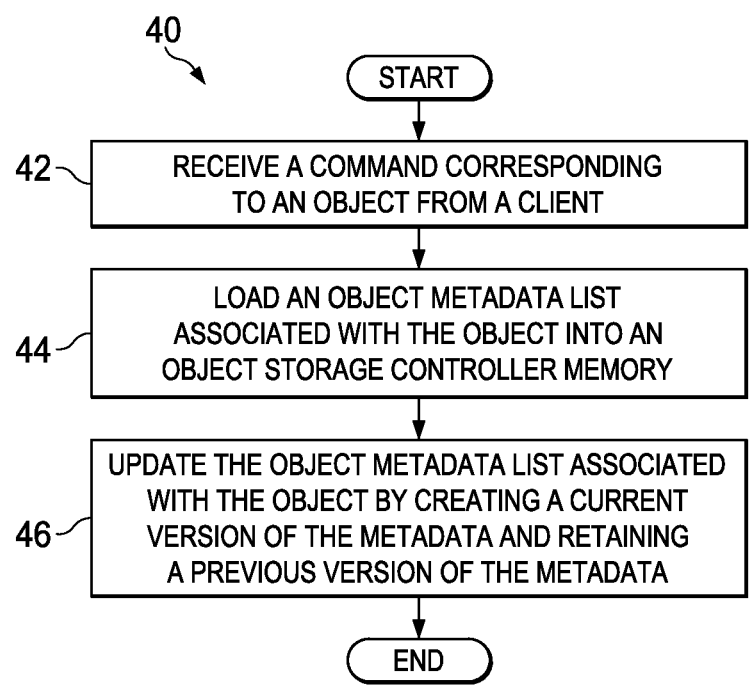
FIG. 5 illustrates an embodiment method of storing metadata in the embodiment distributed storage system of FIG. 1.

Referring now to FIG. 5, an embodiment method 40 of storing metadata in a distributed storage system 10 is illustrated. In block 42, the object storage controller 16 receives a command corresponding to an object from a client. In block 44, the object storage controller 16 loads the object metadata list 26 associated with the object into the object storage controller memory 22. In block 46, the object storage controller 16 updates the object metadata list 26 associated with the object by creating a current version of the metadata 28 and retaining a previous version of the metadata 30.

Figure 6:
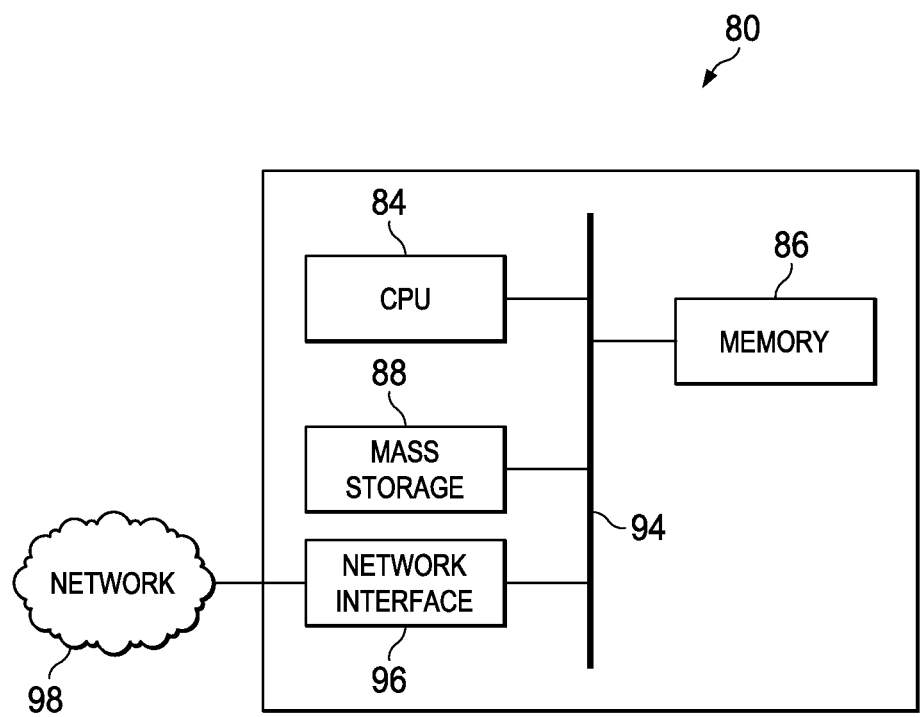
FIG. 6 illustrates a computing platform that may be used for implementing, for example, the devices and methods described herein, in accordance with an embodiment.

FIG. 6 is a block diagram of a processing system 80 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 80 may include a central processing unit (CPU) 84, memory 86 and a mass storage device 88 connected to a bus 94.

The bus 94 may be one or more of any type of several bus architectures including a memory bus or memory controller, a peripheral bus, video bus, or the like. The CPU 84 may comprise any type of electronic data processor. The memory 86 may comprise any type of system memory such as static random access memory (SRAM), dynamic random access memory (DRAM), synchronous DRAM (SDRAM), read-only memory (ROM), a combination thereof, or the like. In an embodiment, the memory 86 may include ROM for use at boot-up, and DRAM for program and data storage for use while executing programs.

The mass storage 88 device may comprise any type of storage device configured to store data, programs, and other information and to make the data, programs, and other information accessible via the bus 94. The mass storage device 88 may comprise, for example, one or more of a solid state drive, hard disk drive, a magnetic disk drive, an optical disk drive, or the like.

The processing system 80 also includes one or more network interfaces 96, which may comprise wired links, such as an Ethernet cable or the like, and/or wireless links to access nodes or different networks. The network interface 96 allows the processing system 80 to communicate with remote systems or units via the networks. For example, the network interface 96 may provide wireless communication via one or more transmitters/transmit antennas and one or more receivers/receive antennas. In an embodiment, the processing system 80 (a.k.a., processing unit) is coupled to a local-area network 98 or a wide-area network 98 for data processing and communications with remote devices, such as other processing units, the Internet, remote storage facilities, or the like.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method of deleting versions of an object in a distributed storage system, comprising:
   receiving, from a client, a delete request for a first version of the object, wherein the delete request includes a first entity tag associated with the first version of the object;
   retrieving, by a primary datacenter, an object metadata list corresponding to the object, wherein the object metadata list includes a stack data structure comprising metadata associated with different versions of the object;
   inserting, by the primary datacenter, a delete marker on top of a first metadata in the object metadata list, the first metadata corresponding to the first version of the object;
   forwarding the delete request to a secondary datacenter to request that a secondary datacenter delete portions of the first version of the object stored by the secondary datacenter, wherein the forwarded delete request includes the first entity tag;
   receiving, by the primary datacenter, a delete response from the secondary datacenter, the delete response indicating a successful deletion of a version of the object; and
   determining, by the primary datacenter, whether the forwarded delete request was processed correctly by the secondary datacenter based on whether the delete response includes the first entity tag, wherein the delete request is deemed to have been processed incorrectly when the delete response excludes the first entity tag.

2. The method of claim 1, further comprising indicating with the delete marker that a version of the object below the delete marker in the stack data structure is no longer available.

3. The method of claim 1, further comprising indicating with the delete marker that a version of the object below the delete marker in the stack data structure has been deleted.

4. The method of claim 1, further comprising indicating with the delete marker that a version of the object below the delete marker in the stack data structure is scheduled for deletion.

5. The method of claim 1, further comprising comparing the first entity tag in the delete request with a second entity tag stored at the secondary datacenter.

6. The method of claim 1, further comprising using an object integrity service to request restoring an object deleted in error on the secondary datacenter.

7. The method of claim 1, wherein the secondary datacenter lacks the capability to recognize the first entity tag in the delete request.

8. The method of claim 1, wherein determining whether the forwarded delete request was processed correctly by the secondary datacenter based on whether the delete response includes the first entity tag comprises:
   determining that the secondary datacenter did not verify that the version of the object deleted by the secondary datacenter was the first version of the object when the delete response excludes the first entity tag.

9. The method of claim 1, wherein the secondary datacenter correctly executes the delete request if the secondary datacenter recognizes the first entity tag in the delete requests, and matches the first entity tag with a stored entity tag.

10. A primary datacenter comprising:
    at least one processor; and
    a non-transitory computer readable storage medium storing programming for execution by the at least one processor, the programming including instructions to:
       receive, from a client, a delete request for a first version of an object, wherein the delete request includes a first entity tag associated with the first version of the object;
       retrieve, by the primary datacenter, an object metadata list corresponding to the object, wherein the object metadata list includes a stack data structure comprising metadata associated with different versions of the object;
       insert, by the primary datacenter, a delete marker on top of a first metadata in the object metadata list, the first metadata corresponding to the first version of the object;
       forward the delete request to a secondary datacenter to request that a secondary datacenter delete portions of the first version of the object stored by the secondary datacenter, wherein the forwarded delete request includes the first entity tag;
       receive a delete response from the secondary datacenter, the delete response indicating a successful deletion of a version of the object; and
       determine whether the forwarded delete request was processed correctly by the secondary datacenter based on whether the delete response includes the first entity tag, wherein the delete request is deemed to have been processed incorrectly when the delete response excludes the first entity tag.

11. The primary datacenter of claim 10, wherein the programming includes further instructions to indicate with the delete marker that a version of the object below the delete marker in the stack data structure is no longer available.

12. The primary datacenter of claim 10, wherein the programming includes further instructions to indicate with the delete marker that a version of the object below the delete marker in the stack data structure has been deleted.

13. The primary datacenter of claim 10, wherein the programming includes further instructions to indicate with the delete marker that a version of the object below the delete marker in the stack data structure is scheduled for deletion.

14. The primary datacenter of claim 10, wherein the programming includes further instructions to compare the first entity tag in the delete request with a second entity tag stored at the secondary datacenter.

15. The primary datacenter of claim 10, wherein the delete marker indicates that versions of the object corresponding to metadata positioned below the delete marker have been deleted or are scheduled to be deleted.

16. The primary datacenter of claim 10, wherein the secondary datacenter lacks the capability to recognize the first entity tag in the delete request.

17. The primary datacenter of claim 10, wherein the instructions to determine whether the forwarded delete request was processed correctly by the secondary datacenter based on whether the delete response includes the first entity tag includes instructions to:

determine that the secondary datacenter did not verify that the version of the object deleted by the secondary datacenter was the first version of the object when the delete response excludes the first entity tag.

18. The primary datacenter of claim 10, wherein the secondary datacenter correctly executes the delete request if the secondary datacenter recognizes the first entity tag in the delete requests, and matches the first entity tag with a stored entity tag.

\* \* \* \* \*